(12) United States Patent
Wasson

(10) Patent No.: US 6,417,595 B1
(45) Date of Patent: Jul. 9, 2002

(54) SPARK SUPPRESSION DUST SEALING FOR A MOTOR APPARATUS

(75) Inventor: Dewain L. Wasson, Hudson, WI (US)

(73) Assignee: McMillan Electric Company, Woodville, WI (US)

(*) Notice: Subject to any disclaimer, the term of this patent is extended or adjusted under 35 U.S.C. 154(b) by 0 days.

(21) Appl. No.: 09/577,650

(22) Filed: May 24, 2000

(51) Int. Cl.⁷ .................................................. H02K 5/14
(52) U.S. Cl. ........................... 310/220; 310/85; 310/89; 310/90; 310/233; 310/88
(58) Field of Search .......................... 310/88, 239, 220, 310/233, 234, 235, 236, 237, 89, 90, 85

(56) References Cited

U.S. PATENT DOCUMENTS

| | | | |
|---|---|---|---|
| 2,744,205 A | 5/1956 | Kalikow | 310/228 |
| 3,233,130 A | 2/1966 | Bates | 310/88 |
| 3,243,618 A | 3/1966 | Ward | 310/88 |
| 3,673,447 A | 6/1972 | Zumbach et al. | 310/227 |
| 3,731,126 A | 5/1973 | Hagenlocher et al. | 310/68 |
| 3,776,559 A * | 12/1973 | Cawthorn | 277/56 |
| 3,919,574 A | 11/1975 | Schmuck | 310/68 |
| 4,464,593 A * | 8/1984 | Kofiuk | 310/58 |
| 4,476,410 A | 10/1984 | Wolcott | 310/228 |
| 4,538,085 A | 8/1985 | Tanaka | 310/239 |
| 4,546,280 A | 10/1985 | Pflüger | 310/68 D |
| 4,574,212 A | 3/1986 | Haijkens | 310/88 |
| 4,626,720 A | 12/1986 | Fukasaku et al. | 310/62 |
| 4,680,495 A | 7/1987 | Chiampas et al. | 310/88 |
| 4,689,507 A * | 8/1987 | Baker et al. | 310/62 |
| 4,730,135 A | 3/1988 | Dolderer et al. | 310/68 D |
| 4,766,337 A | 8/1988 | Parkinson et al. | 310/58 |
| 4,908,538 A | 3/1990 | Geberth, Jr. | 310/59 |
| 5,004,943 A | 4/1991 | Gagneux | 310/239 |
| 5,132,580 A | 7/1992 | Aoki et al. | 310/239 |
| 5,291,087 A | 3/1994 | Pollick et al. | 310/86 |
| 5,345,132 A | 9/1994 | Sasaki et al. | 310/239 |
| 5,683,184 A | 11/1997 | Striedacher et al. | 384/138 |
| 5,864,194 A | 1/1999 | Okamoto et al. | 310/239 |
| 6,100,617 A * | 8/2000 | Carter et al. | 310/90 |

\* cited by examiner

*Primary Examiner*—Burton S. Mullins
(74) *Attorney, Agent, or Firm*—Merchant & Gould P.C.

(57) ABSTRACT

In one embodiment of the present invention, an electric motor is provided. A component of the electric motor, the commutator assembly, has a commutator and a brush assembly. The brush assembly encloses conductive brushes that are in contact with the commutator. A shaft is rotatably mounted about an axis, and a bearing is disposed around the shaft. The commutator is connected to the shaft, and a first seal surrounds the commutator. The first seal substantially isolates the commutator assembly from the internal ambient atmosphere of the electric motor. Further, a second seal substantially isolates the shaft and the bearing from the commutator and the conductive brushes.

40 Claims, 9 Drawing Sheets

SPARK SUPPRESSION DUST SEALING FOR A MOTOR APPARATUS

FIELD OF THE INVENTION

The present invention relates generally to the field of permanent magnet motors, wound field motors, and other mechanically commutated motor devices. In particular, this invention relates to direct current and universal motors having close tolerance seals for the suppression of sparks and leakage current losses within the motors.

BACKGROUND OF THE INVENTION

Various permanent magnet motors and wound field motors must be operable in volatile environments. Examples of permanent magnet and wound field motors include direct current ("DC") and universal motors. DC and universal motors produce sparks by the contact of a conductive brush and a commutator. In a volatile environment, the sparks produced by the conductive brush and commutator may produce flammable activity.

Additionally, a DC or universal motor that is totally sealed for controlling sparks from being released into ambient air does not have forced air flowing through the internal components of the motor. A motor that is cooled by forced airflow through the motor is normally smaller and manufactured with less materials than a similar motor that is designed to be totally enclosed.

Further, in a totally sealed DC or universal motor, the shaft and bearing of an electric motor are normally grounded, and the commutator and conductive brushes are at a high potential. The conductive brushes are in contact with the commutator of the electric motor and carbon dust from the brushes coat the surface between the bearing and the brushes. In turn, the carbon brush dust causes a leakage current loss within the system.

A DC motor is generally a lower speed motor that includes various components such as an armature, a commutator or collector and conductive brushes that are well known in the art of electric motors. The armature of a DC motor includes a cylindrical iron core that carries the active conductors embedded in slots of the iron core and connected to segments of the commutator. Direct current is carried to and from the armature by stationary conductive brushes. The rotating commutator automatically switches or distributes current to the conductors so that the magnetic flux and subsequent torque of a motor is steady and in one direction. Further, a DC motor includes a permanent magnet that is utilized for the stationary magnetic field, but there is a minimal space between the permanent magnet and the armature. Due to the minimal space, there is a negligible amount of cooling in the interior of the DC motor. Thus, in order to cool the interior of a DC motor in an aggressive manner, air must be brought into the motor, and then expelled from the motor.

A universal motor is a relatively high speed motor in which the speed can be varied. A universal motor is designed to operate on direct or alternating current. Further, a universal motor includes a laminated magnetic circuit to minimize eddy-current and hysteresis losses. Similar to a DC motor, the universal motor has minimal space in the interior of the motor. Thus, it is preferred to cool the interior of the motor by having air brought into the motor and then expelled from the motor.

An example of an industry that utilizes DC and universal motors in the pump assembly is the consumer, professional and industrial painting industry. In the painting industry, liquid paint is pumped via a DC or universal motor from its holding source. Upon the paint being pumped by the motor, the paint flows through a fluid filter and is released through a nozzle onto the working surface.

A major component of the paint spraying system is the pump that is powered by a DC or universal motor. Although induction alternating current motors and gasoline powered engines are utilized, DC and universal motors are preferred in the industrial paint spraying system because these types of motors are less bulky, lighter, more efficient, and less noisy than a gasoline powered engine. Further, DC or universal motors have higher starting torques, higher acceleration rates, and can be speed controlled more easily then alternating current motors.

A problem exists when a paint spraying system is utilized in a chemically volatile environment. DC and universal motors produce sparks by the electrical and mechanical contact of the conductive brushes and commutator. In a volatile environment, the sparks produced by the contact of the conductive brushes and commutator may produce flammable activity. In such a situation, a fully enclosed electric motor may be necessary to prohibit the sparking within the electric motor from producing flammable activity.

In prior art electric motors, a solution was to provide a motor casing for enclosing the entire motor assembly. The prior motors provided a labyrinth seal to isolate sparks produced within the cavity from ambient atmosphere surrounding the motor housing. The prior motors also provided an enclosed motor assembly that cooled the motor assembly by an internal fan within the housing.

The prior art electric motors do not disclose a separately shielded or enclosed compartment for sealing the commutator and conductive brushes while effectively cooling the other components of the motor assembly. Additionally, such known devices have heretofore not provided a simple, efficient and cost effective motor configuration that provides adequate spark protection while maintaining proper cooling of the motor assembly. The totally enclosed motor housing configurations are relatively expensive to produce. Further, a simple cost-effective approach has heretofore not been devised for adequately enclosing the commutator and conductive brush assemblies where sparking is initiated within the motor.

A further problem exists within the sealed or enclosed compartment for sealing the commutator and conductive brushes. As previously disclosed, the electric motor includes a commutator, conductive brushes and a bearing for shaft rotation. As the conductive brushes begin to wear, a byproduct of carbon dust is released within the sealed and enclosed commutator assembly. The carbon dust deposits within the sealed commutator assembly. After an extended period of time, the carbon dust eventually provides a leakage current path between, the energized conductive brushes and commutator surface, and the grounded metal shaft and bearing. As a result, leakage current losses are present in the system.

Prior art motors do not disclose a single component close tolerance seal between, the grounded bearing and shaft and the energized conductive brushes and commutator. Accordingly, the carbon dust formed within commutator assembly induces a leakage current path within the system.

Therefore, a need exists for a simple, but yet effective spark suppression motor apparatus that is relatively inexpensive to manufacture. Additionally, a need exists for an electric motor that is effective in preventing sparking within the motor assembly, but yet provides the required cooling of the motor assembly. Further, there is a need for a close fitting shield around the conductive brushes and commutator that minimizes the internal volume of the commutator assembly in order to keep internal flammable activity to a minimum. A need also exists for a close tolerance fit between the commutator seal and the commutator in order to prevent the spread of any spark or flame to the external atmosphere. Moreover, a need exists for a close tolerance seal that alleviates leakage current losses within the electric motor.

SUMMARY OF THE INVENTION

In one aspect of the present invention, an electric motor is provided. A component of the electric motor, the commutator assembly, includes a commutator and a brush assembly. The brush assembly encloses conductive brushes that are in contact with the commutator. A shaft is rotatably mounted about an axis, and a bearing is disposed around the shaft. The commutator is connected to the shaft. Additionally, a seal surrounds the commutator, wherein the seal substantially isolates the commutator assembly from the internal ambient atmosphere of the electric motor.

In another aspect of the present invention, an electric motor is provided. A component of the electric motor, the commutator assembly, includes a commutator and a brush assembly. The brush assembly encloses conductive brushes that are in contact with the commutator. A shaft is rotatably mounted about an axis, and a bearing is disposed around the shaft. The commutator is connected to the shaft. Additionally, a seal substantially isolates the shaft and the bearing from the commutator and the conductive brushes.

In another aspect of the present invention, an electric motor is provided. A component of the electric motor, the commutator assembly, includes a commutator and a brush assembly. The brush assembly encloses conductive brushes that are in contact with the commutator. A shaft is rotatably mounted about an axis, and a bearing is disposed around the shaft. The commutator is connected to the shaft, and a first seal surrounds the commutator. The first seal substantially isolates the commutator assembly from the internal ambient atmosphere of the electric motor. Further, a second seal substantially isolates the shaft and the bearing from the commutator and the conductive brushes.

Another aspect of the present invention relates to a method of isolating a commutator assembly from the internal ambient of an electric motor. The method comprises providing a commutator assembly including a commutator and a brush assembly, in which the brush assembly includes conductive brushes in contact with the commutator. The method further comprises providing a shaft rotatably mounted about an axis, and a bearing disposed around the shaft. Additionally, the method comprises providing the commutator connected on the shaft, and disposing a seal surrounding the commutator, wherein the seal substantially isolates the commutator assembly from the internal ambient atmosphere of the electric motor.

A further aspect of the present invention relates to the method of isolating a shaft and a bearing from a commutator and conductive brushes. The method comprises providing a commutator assembly including a commutator and a brush assembly, the brush assembly including conductive brushes in contact with the commutator. Further, the method comprises providing a shaft rotatably mounted about an axis, and provides a bearing disposed around the shaft and the commutator connected to the shaft. The method comprises disposing a seal that substantially isolates the shaft and the bearing from the commutator and the conductive brushes.

A further aspect of the present invention is related to a method of isolating a commutator assembly from the internal ambient of an electric motor, and a shaft and a bearing from a commutator and conductive brushes. The method comprises providing a commutator assembly having a commutator and a brush assembly, the brush assembly including conductive brushes in contact with the commutator. The method further comprises providing a shaft rotatably mounted about an axis. Additionally, the method comprises providing a bearing disposed around the shaft, and the commutator connected to the shaft. Additionally, the method comprises disposing a first seal surrounding the commutator, wherein the first seal substantially isolates the commutator assembly from the internal ambient atmosphere of the electric motor. The method further comprises disposing a second seal, wherein the second seal substantially isolates the shaft and the bearing from the commutator and the conductive brushes.

BRIEF DESCRIPTION OF THE DRAWINGS

The organization and manner of the structure and operation of the invention, advantages thereof, may best be understood by reference to the following description, taken in connection with the accompanying drawings.

DETAILED DESCRIPTION OF THE PREFERRED EMBODIMENT

Figure 1:
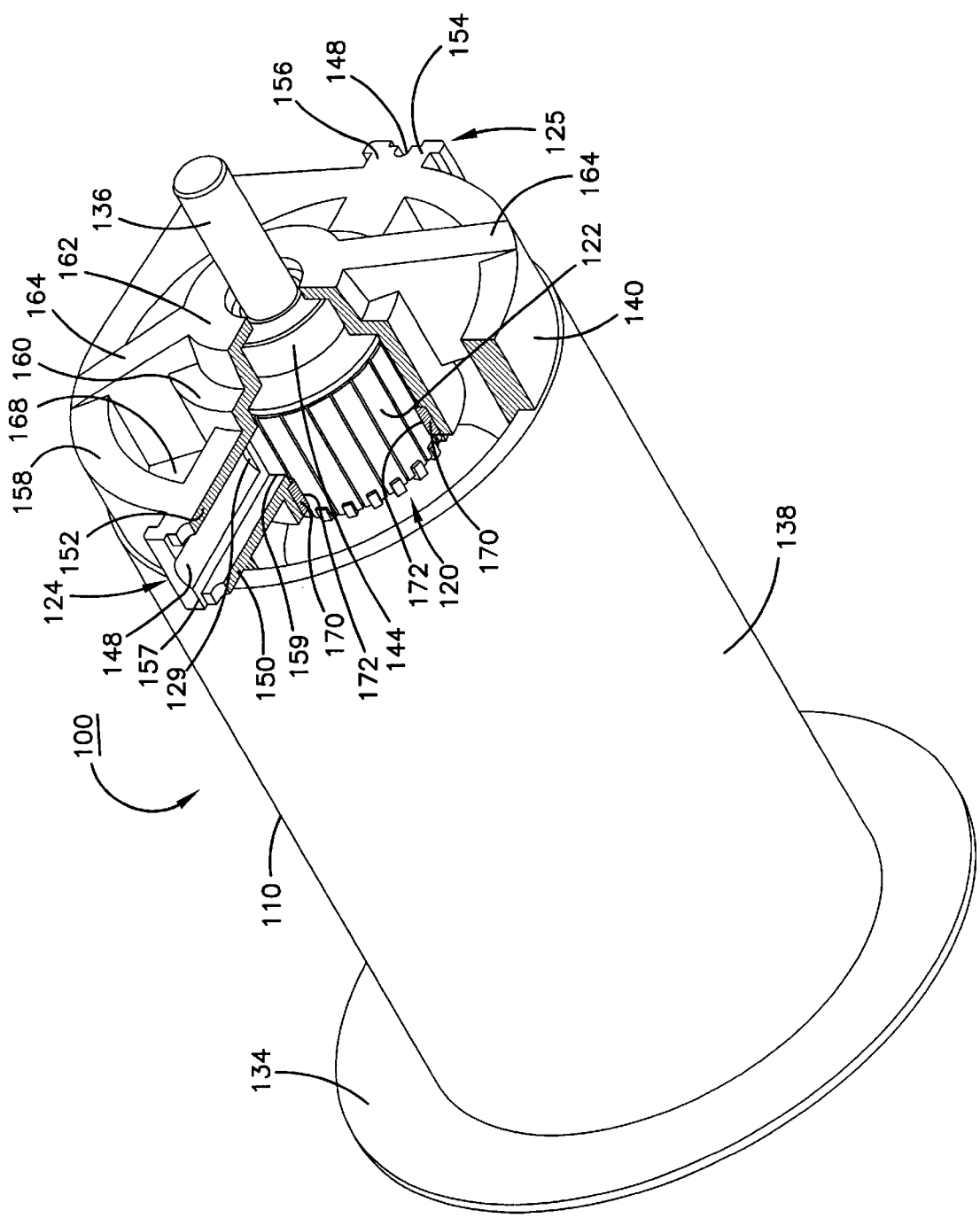
FIG. 1 is a partial cut-away perspective view of an electric motor of one embodiment of the invention.

Preferred embodiments of the present invention will be described in detail with reference to the drawings, wherein like reference numerals represent like parts and assemblies throughout the several views. This description does not limit the scope of the invention, which is limited only by the scope of the attached claims.

In general terms, the present invention relates to a commutator seal that effectively contains sparks within a commutator assembly. In general terms, the present invention also relates to a dust seal that substantially isolates a bearing from a commutator and conductive brushes in order to alleviate leakage current losses associated with the electric motor.

The present invention has many advantages. For example, some embodiments of the present invention offers a simple, cost effective, and practical spark suppression motor apparatus. Another advantage of some embodiments is providing an electric motor that is effective in preventing sparking and potential ignition activity within the motor assembly, but yet provides the optimum cooling of the motor assembly. Yet another advantage of some embodiments of the present invention is that they provide a close fitting shield around the conductive brushes and commutator that minimizes the internal volume of the motor assembly in order to keep internal flammable activity to a minimum. Also, another advantage of some embodiments is that they provide a close tolerance fit between the commutator seal and the commutator in order to prevent the spread of any spark or flame to the external atmosphere. Moreover, another advantage of some embodiments are a close tolerance seal that alleviates leakage current losses within the electric motor.

Figure 2:
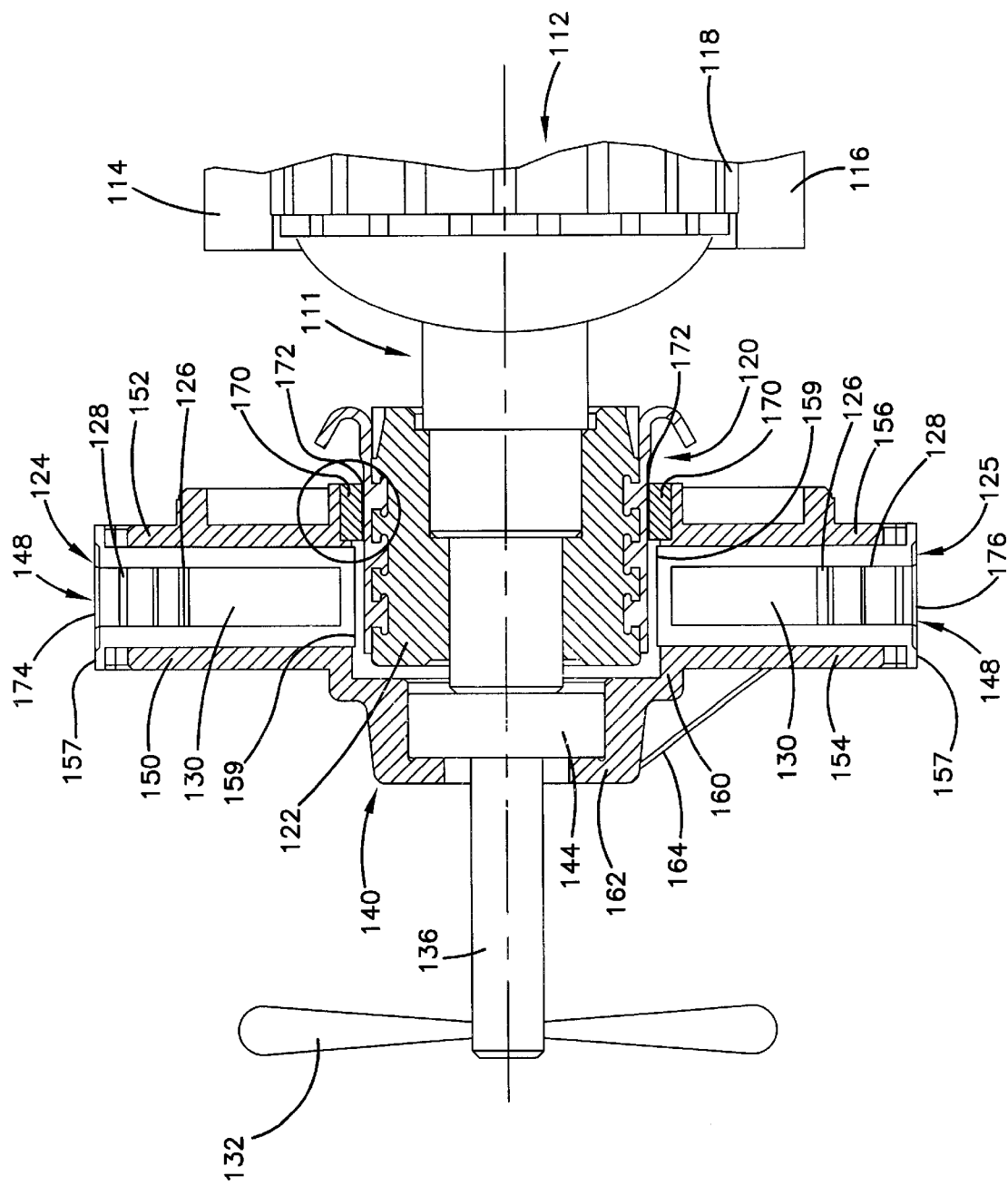
FIG. 2 is a partial cross-sectional view of the electric motor of FIG. 1.

Generally referring to FIGS. 1 and 2, there is diagramatically shown an electric motor 100 of the direct current ("DC") type. While a DC type motor is shown and described herein, the same principles concerning spark suppression, motor cooling and dust sealing also apply to universal motors. The electric motor 100 generally includes a housing 110 that encloses a motor assembly 111. The motor assembly 111 comprises a rotational assembly 112, a stationary assembly 113 and a commutator assembly 120. The rotational assembly 112 further includes an armature 118. The stationary assembly 113 further includes permanent magnets 114, 116. Additionally, the commutator assembly 120 includes a commutator 122, brush assemblies 124, 125 and a bearing 144. The brush assemblies 124, 125 include brush assembly walls 150, 152, 154, 156, brush springs 128, brush spring stops 129 and conductive brushes 130. Further, the electric motor 100 includes a backplate 134 and a shaft 136. The electric motor 100 can be sufficiently cooled by either forced air or natural convection. The electric motor 100 may also include a fan 132 to produce a forced air cooled electric motor 100.

The housing 110 includes a thin-walled hollow cylindrical wall unit 138 opened at both ends. At the front end of the cylindrical wall unit 138, a frontplate 140 is integrally connected to the cylindrical wall unit 138. The integral connection of the frontplate 140 and the cylindrical wall unit 138 is achieved by way of fasteners, such as a nut and bolt fastening system, that forms a permanent connection there between. At the back end of the cylindrical wall unit 138, a backplate 134 is integrally connected to the cylindrical wall unit 138. The integral connection of the backplate 134 and the cylindrical wall unit 138 is achieved by way of fasteners, such as a nut and bolt fastening system, that forms a permanent connection there between. In a preferred embodiment of the invention, a bolt clamps the front plate, backplate and housing together to form an integrated unit.

As shown in FIG. 2, a pair of permanent magnets 114, 116 providing a north and south polar relation, are substantially tube half shaped and of substantially the same size. The permanent magnets 114, 116 are provided on the inner surface of the cylindrical wall unit 138 at an equal radial pitch. Further embodiments of the invention may include a plurality of permanent magnet pairs that provide a north and south polar relation.

The shaft 136 is rotatably disposed within a front bearing 144 and a back bearing (not shown). The front bearing 144 and the back bearing are secured in central portions of the frontplate 140 and the backplate 134. The shaft 136 may project from either the frontplate 140 or the backplate 134. Further, a fan 132 may be fastened to either end of the shaft 136 projecting out of the frontplate 140 or backplate 134.

The armature 118 includes a laminated iron core provided in its outer peripheral portion with a plurality of axial slots, formed at a constant radial pitch, and a coated wire wound in the axial slots. In another embodiment of the invention, the armature 118 may also include an iron less winding with coated wire. The armature 118 is mounted on the portion of the shaft 136 opposed to the permanent magnets 114, 116 with a constant radial air tolerance space between concaved inner peripheral surfaces of the permanent magnets 114, 116 and the outer peripheral surface of the armature 118.

The commutator 122 includes a plurality of copper elongate strips arranged at a constant radial pitch. The commutator 122 is mounted on the shaft 136 and is adjacent to the armature 118. The commutator 122 and the armature 118 are electrically connected to each other by way of a winding connection. The brush springs 128 and conductive brushes 130 are positioned between brush assembly walls 150–156. The structure as a whole is designated generally as brush assemblies 124, 125 having a top 157 and a bottom portion 159. The brush assembly walls 150–156 extend from the frontplate 140 in a direction perpendicular from the shaft 136. The brush assembly walls 150–156 have at the center an opening 148 for receiving the brush springs 128 and the conductive brushes 130. The brush assembly walls 150–156 and the conductive brushes 130 have a close tolerance fit in order to reduce the potential for flammable activity. Further, as specifically shown in FIG. 1, brush spring stops 129 are located proximate the bottom portion 159 of the brush assemblies 124, 125 for effectively sealing sparks from entering the ambient atmosphere. The brush spring stops 129 also remove pressure on the conductive brushes 130 when the conductive brushes 130 sufficiently deteriorate. Additionally, the brush assemblies 124, 125 are substantially tube shaped and are substantially the same size. The brush assemblies 124, 125 are at an equal radial pitch, and are generally positioned 180° relative to each other about the shaft.

The conductive brushes 130 are biased by brush springs 128 onto the peripheral surface of the commutator 122 at a suitable pressure thereby supplying electric power to the commutator 122. Brush end caps 174, 176 are positioned on the top edge of the brush assembly walls 150–156 to cover the brush assemblies 124, 125.

The electric motor 100 may be assembled by having a single metallic plate curved by a press process or the like into tube halves that forms the cylindrical wall unit 138. An adhesive is uniformly placed over the convex outer surface of the permanent magnets 114, 116. In a preferred embodiment of the invention, a two-part acrylic adhesive is utilized for placement over the convex outer surface of the permanent magnets 114, 116. The permanent magnets 114, 116 are fixedly located on the inner concaved surface of the cylindrical wall unit 138.

The armature 118 and the commutator 122 are axially mounted on the shaft 136 in an adjacent position in relation to each other. The shaft 136 is located in the housing 110 in such a manner that the armature 118 is axially aligned with the permanent magnets 114, 116. A conventional back bearing may be mounted in the backplate 134, or in a preferred embodiment of the invention, the back bearing is mounted on the shaft 136. Additionally, in a preferred embodiment of the invention, the back bearing may be a ball, roller, or sleeve bearing and the like.

The end of the shaft 136 is inserted into the backplate 134 so that the shaft 136 is supported by a conventional back bearing. The brush assembly walls 150–156 are formed on the frontplate 140. The brush assembly walls 150–156 hold the brush springs 128 and the conductive brushes 130 that form the brush assemblies 124, 125. Within the brush assemblies 124, 125 the conductive brushes 130 are positioned in contact with the commutator 122. Brush end caps 172, 174 fully enclose and seal the brush assemblies 124, 125. Then, the frontplate 140 is fitted and integrally connected from the outer side to the front of the housing 110. A front bearing 144 is mounted in the frontplate 140 or in a preferred embodiment of the invention, the front bearing 144 is mounted on the shaft 136. The shaft 136 is disposed within the front bearing 144. In a preferred embodiment of the invention, the front bearing 144 may be either a ball, roller or sleeve bearing.

Figure 3:
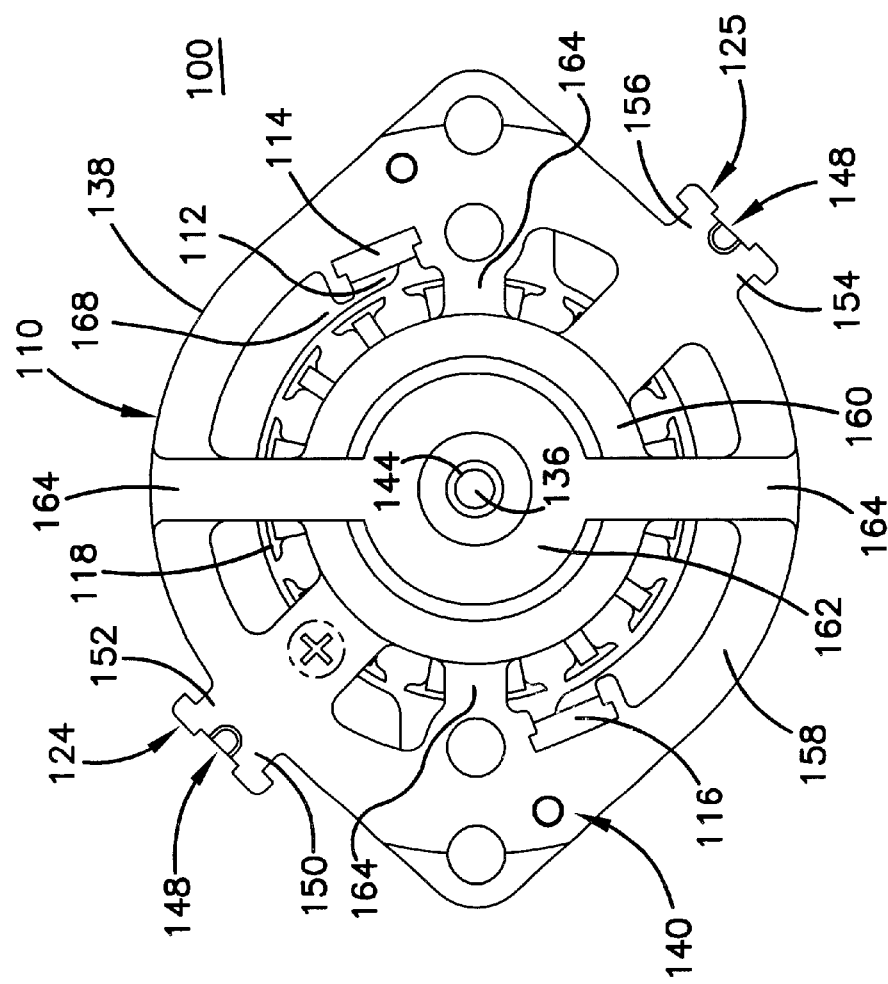
FIG. 3 is a front view of the electric motor of FIG. 1.

As shown in FIGS. 1 and 3, a further aspect of the present invention is encompassed in the frontplate 140. The frontplate 140 is generally molded from a non-conductive material. For example, in one embodiment, the frontplate 140 is molded from a thermoset or thermoplastic material for inhibiting electrical conductivity. The frontplate 140 radially encompasses the shaft 136. The frontplate 140 includes an outer collar 158 that is somewhat circular in shape and encompasses the outer edge of the front plate 140. The outer collar 158 is the point of connection with the cylindrical wall unit 138. The outer collar 158 is preferably integrally connected to the cylindrical wall unit 138. The cylindrical wall unit 138 serves as a flux path for the fixed magnetic field as well as the armature magnetic field.

The front plate also includes a commutator collar 160. The commutator collar 160 radially encompasses and essentially seals the commutator 122. The commutator collar 160 is a lesser diameter than the outer collar 158, and has a longer axial length compared to the outer collar 158.

Integrally connected to and extending from the commutator collar 160, is a bearing collar 162. The bearing collar 162 radially encompasses and essentially seals the front bearing 144. The bearing collar 162 is a lesser diameter than the commutator collar 160.

A plurality of ribs 164 are formed on the frontplate 140. The plurality of ribs are formed on the frontplate 110 for two specific purposes. First, the plurality of ribs 164 are integrally connected to the outer collar 158, and having substantially the same width and length. The plurality of ribs 164 extend angularly from the outer collar 158 to the bearing collar 162. The plurality of ribs 164 are integrally connected to the outer collar 158, the commutator collar 160, and the bearing collar 162 for forming and integrally connecting the respective collars. Second, due to the outer collar 158 having a greater diameter than the commutator collar 160, a radial space is formed between the respective collars. The connection of the plurality of ribs 164 from the outer collar 158 to the bearing collar 162, form air canals 168 that allow axial air flow into the housing 110.

A fan 132 can optionally be included to further assist in supplying axial air flow to the electric motor 100. As the electric motor 100 is supplied with electric power to drive the fan 132, the atmosphere or internal air of the compartment is induced or drawn through the air canals 168 into or out of the housing 110.

The air axially flows in the housing 110. When the air enters or exits the housing 110 via the air canals 168, the air is drawn over the armature 118. The air then flows in an axial direction through the radial tolerance space between the armature 118 and the permanent magnets 114, 116. The axial flow of the air thereby effectively cools the armature 118 in which the heat value is greater than in any other portion of the motor.

As shown in FIGS. 1 and 2, associated with the commutator collar 160 is a commutator seal 170. At the back edge of the commutator collar 160, a female space is formed between the commutator collar 160 and the commutator 122. In order to seal the female space from the armature assembly 112, the commutator seal 170, which acts a male counterpart to the female space, is integrally connected to the back edge of the commutator collar 160, and forms a labyrinth seal therein. The commutator seal 170 radially surrounds the commutator 122. The commutator seal 170 essentially prohibits sparks that are created between the commutator 122 and the conductive brushes 130 from entering the internal ambient of the electric motor and eventually the external ambient atmosphere.

Figure 4:
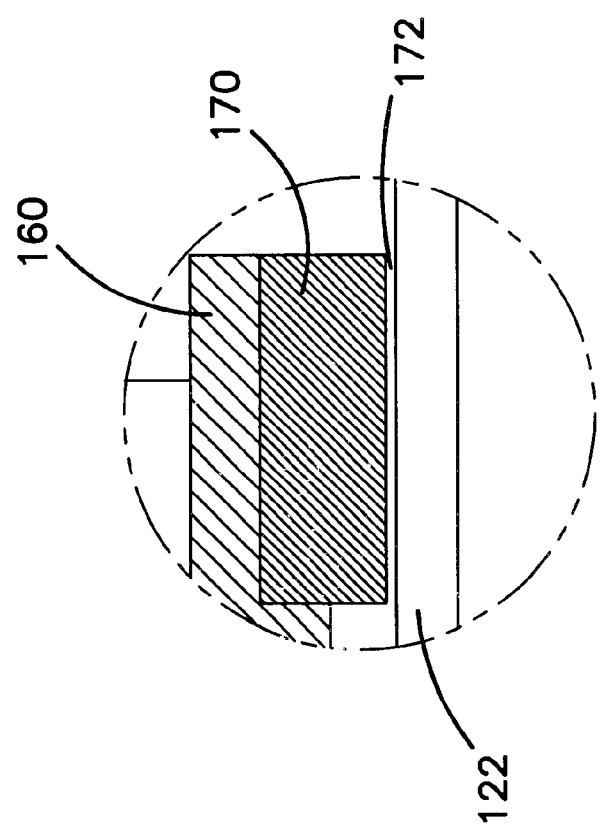
FIG. 4 is a more detailed cross-sectional view of the electric motor of FIG. 2.

Specifically shown in FIG. 4, the commutator seal 170 is not in direct contact with the commutator 122. The tolerance space 172 is of such a negligible distance that sparks cannot exit the commutator assembly 120 into the armature assembly 112. Further, the tolerance space is negligible enough to minimize and prevent the spread of a flame or spark to the ambient atmosphere.

In an alternative embodiment, a commutator seal may be integrally connected to the commutator. The integral connection of the commutator seal with the commutator forms a seal between the commutator seal and the female space that is formed between the commutator collar and the commutator, and is located at the back edge of the commutator collar.

In a first alternative embodiment, the commutator seal is press fit on the commutator. In a second alternative embodiment the commutator seal forms a contact seal with the commutator. In both embodiments, the commutator seal radially surrounds the commutator. The commutator seal essentially prohibits sparks that are created between the commutator and the conductive brushes from entering the internal ambient of the electric motor and eventually the external ambient atmosphere.

Figure 5:
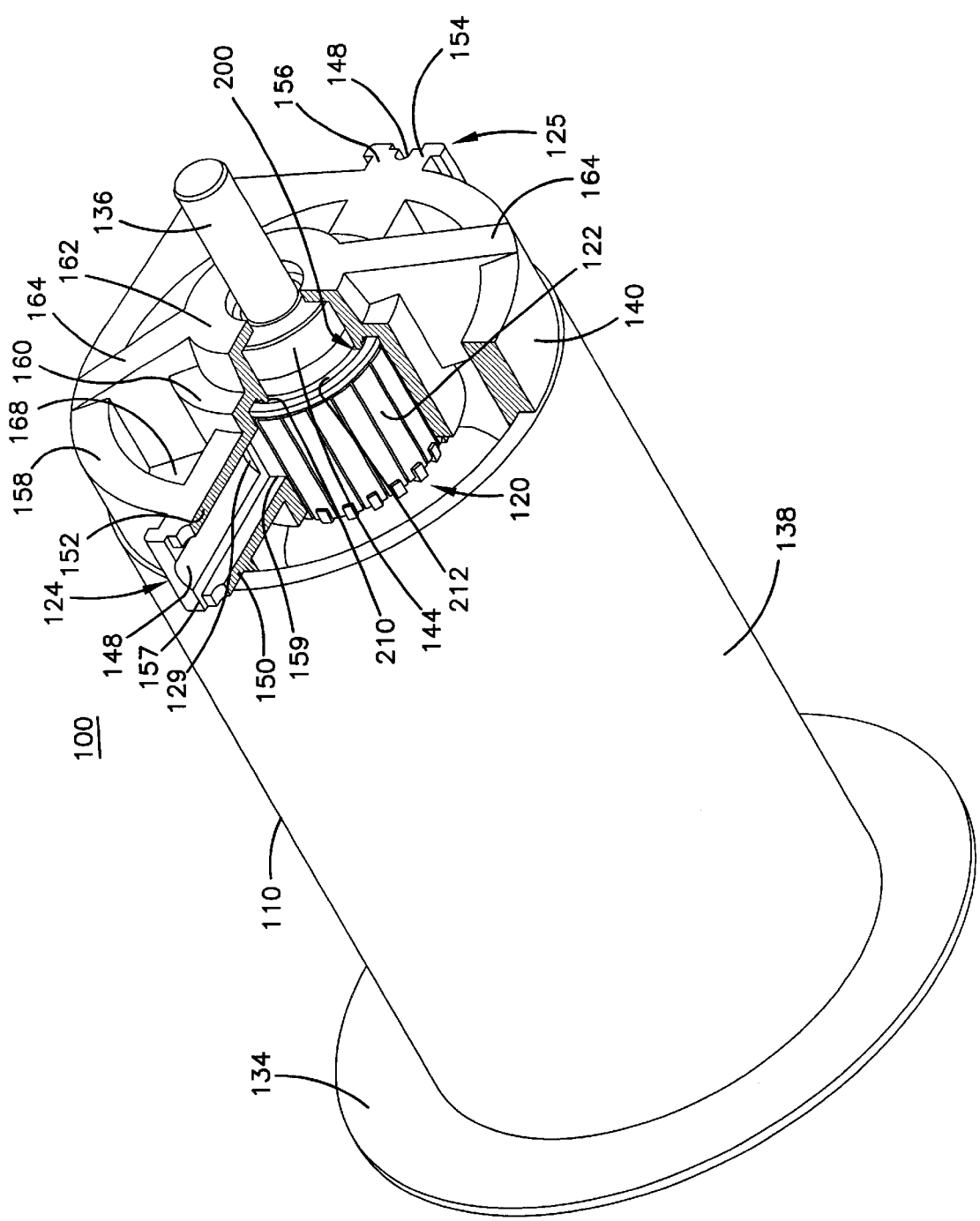
FIG. 5 is a partial cut-away perspective view of an electric motor of another embodiment of the invention.
Figure 6:
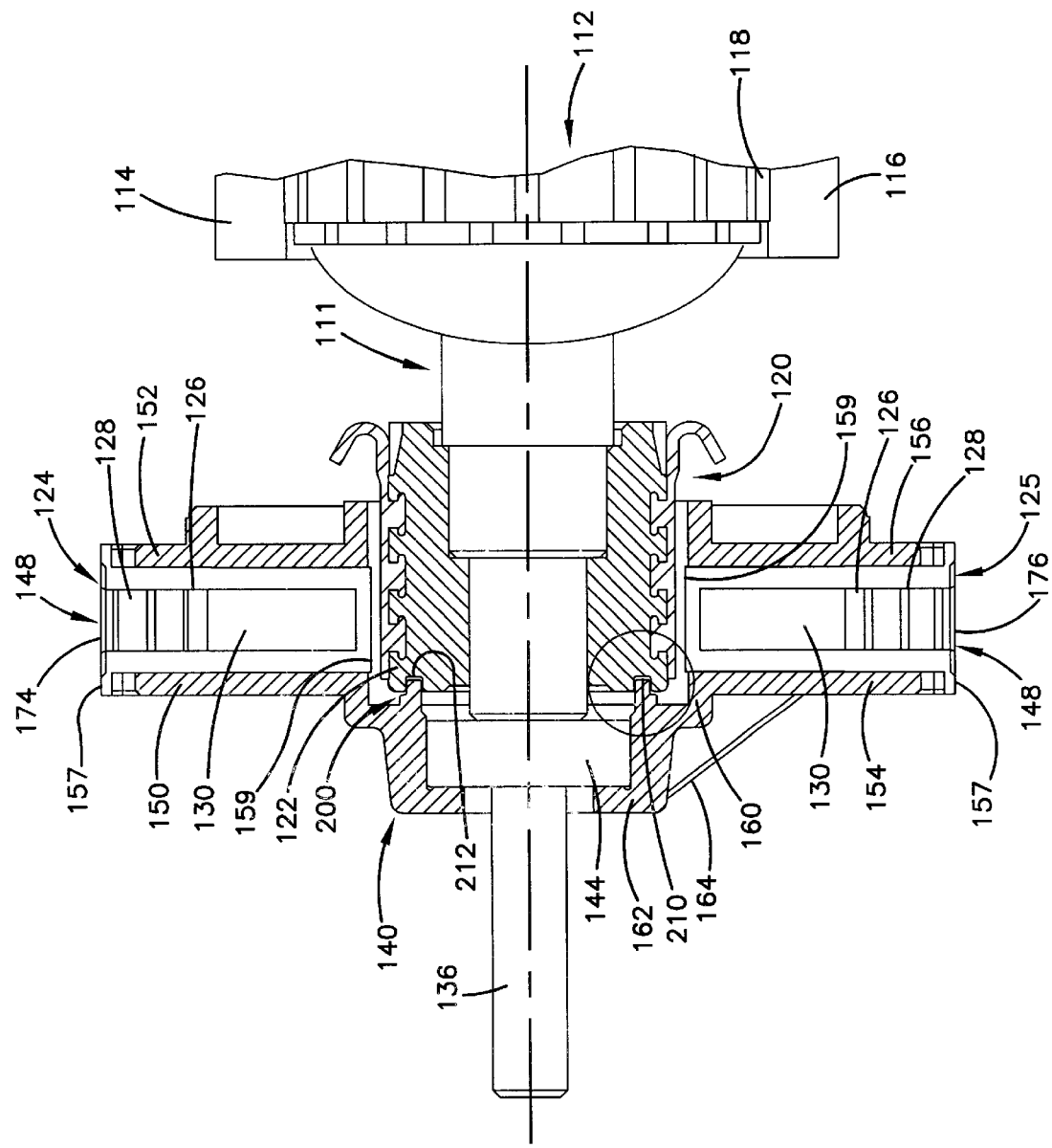
FIG. 6 is a partial cross-sectional view of the electric motor of FIG. 5.

Referring to FIGS. 5 and 6, there is diagramatically shown a second embodiment of the electric motor 100. As shown in FIGS. 5 and 6, the electric motor 100 generally includes a housing 110 having a frontplate 140 and backplate 134. Additionally, a shaft 136 is rotatably disposed within a front bearing 144. The front bearing 144 is secured in central portions of the frontplate 140.

The housing 110 encloses a motor assembly 111 designated by a rotational assembly 112, a stationary assembly 113 and a commutator assembly 120. The rotational assembly 112 further includes an armature 118. The stationary assembly 113 includes permanent magnets 114, 116. Additionally, the commutator assembly 120 includes a commutator 122 and brush assemblies 124, 125. The brush assemblies 124, 125 include brush assembly walls 150, 152, 154, 156, brush springs 128, brush spring stops 129 and conductive brushes 130. Further, the electric motor 100 includes a backplate 134 and a shaft 136. The electric motor 100 can be sufficiently cooled by either forced air or natural convection.

FIGS. 5 and 6 show a dust seal 200 that effectively inhibits leakage current losses between, the conductive brushes 130 and commutator 122, and the shaft 136 and front bearing 144. The dust seal 200 generally alleviates leakage current losses by providing a longer leakage current path via a labyrinth seal. The labyrinth seal is formed by the inter engagement of an axial protrusion ring 210 and an axial groove ring 212. Specifically, the labyrinth seal isolates the carbon dust produced by the conductive brushes 130 from the grounded metal surfaces of the shaft 136 and the front bearing 144.

A component of the dust seal 200 includes a bearing collar 162. The bearing collar 162 radially encompasses and essentially separates the front bearing 144 from ambient atmosphere. The axial protrusion ring 210 is integrally molded and arranged circumferentially around the back edge of the bearing collar 162. In an alternative embodiment, the axial protrusion ring may be integrally molded and arranged circumferentially around an end portion edge of the commutator.

An additional component of the dust seal 200 includes the commutator 122. On the end portion of the commutator 122 that reciprocally faces the back edge of the bearing collar 162, the axial groove 212 is inset and arranged circumferentially around the end portion of the commutator 122. In an alternative embodiment, the axial groove may be inset and arranged circumferentially around the end portion of the back edge of the bearing collar.

In order to maintain a tight tolerance seal, the axial protrusion ring 210 acts as a male counterpart to a female member that is encompassed by an axial groove ring 212. Both the axial protrusion ring 210 and the axial groove ring 212 are generally manufactured from a non-conductive material. For example, in one embodiment, the axial protrusion ring 210 and the axial groove ring 212 are molded and manufactured from a thermoset or thermoplastic material in order to alleviate leakage current losses.

Figure 7:
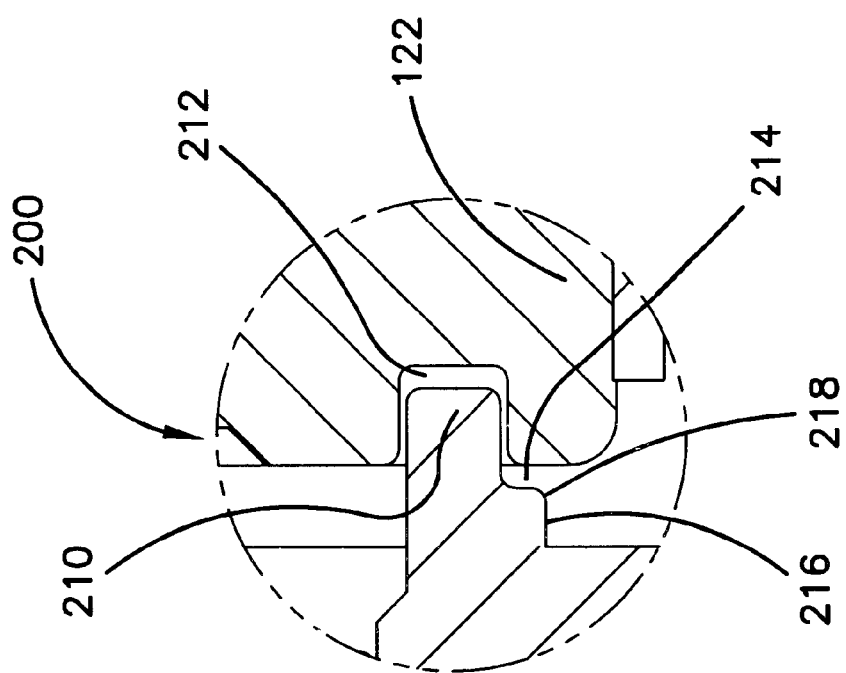
FIG. 7 is a more detailed cross-sectional view of the electric motor of FIG. 6.

Specifically shown in FIG. 7, the dust seal 200 is formed by the mated engagement of the axial protrusion ring 210 and the axial groove ring 212. The axial protrusion ring 210 is not in direct contact with the axial groove ring 212 of the commutator 122. Additionally, a first protrusion ring edge 214 and a second protrusion ring edge 216 are molded by way of a chamfer edge 218 between the first protrusion edge 214 and the end portion of the commutator 122. Further, the tolerance space is negligible enough to alleviate leakage current losses within the electric motor 100.

In alternative embodiments of the invention, the dust seal may be formed by a contact seal between the bearing collar and the commutator. Further, the dust seal may be press fit on the back edge of the bearing collar or on the end portion of the commutator, for substantially isolating the shaft and the bearing from the commutator and the conductive brushes.

Figure 8:
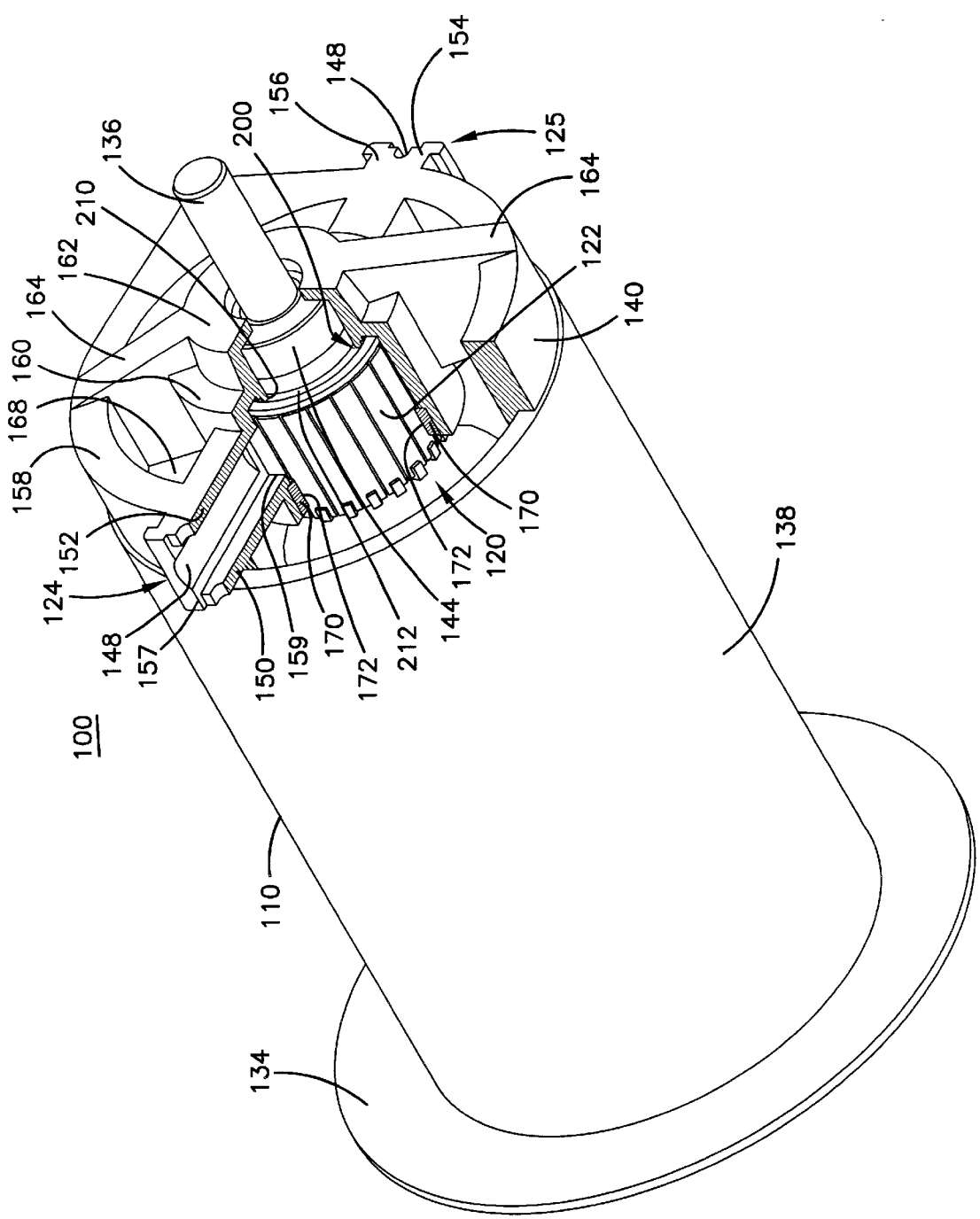
FIG. 8 is a partial cut-away perspective view of an electric motor of another embodiment of the invention.
Figure 9:
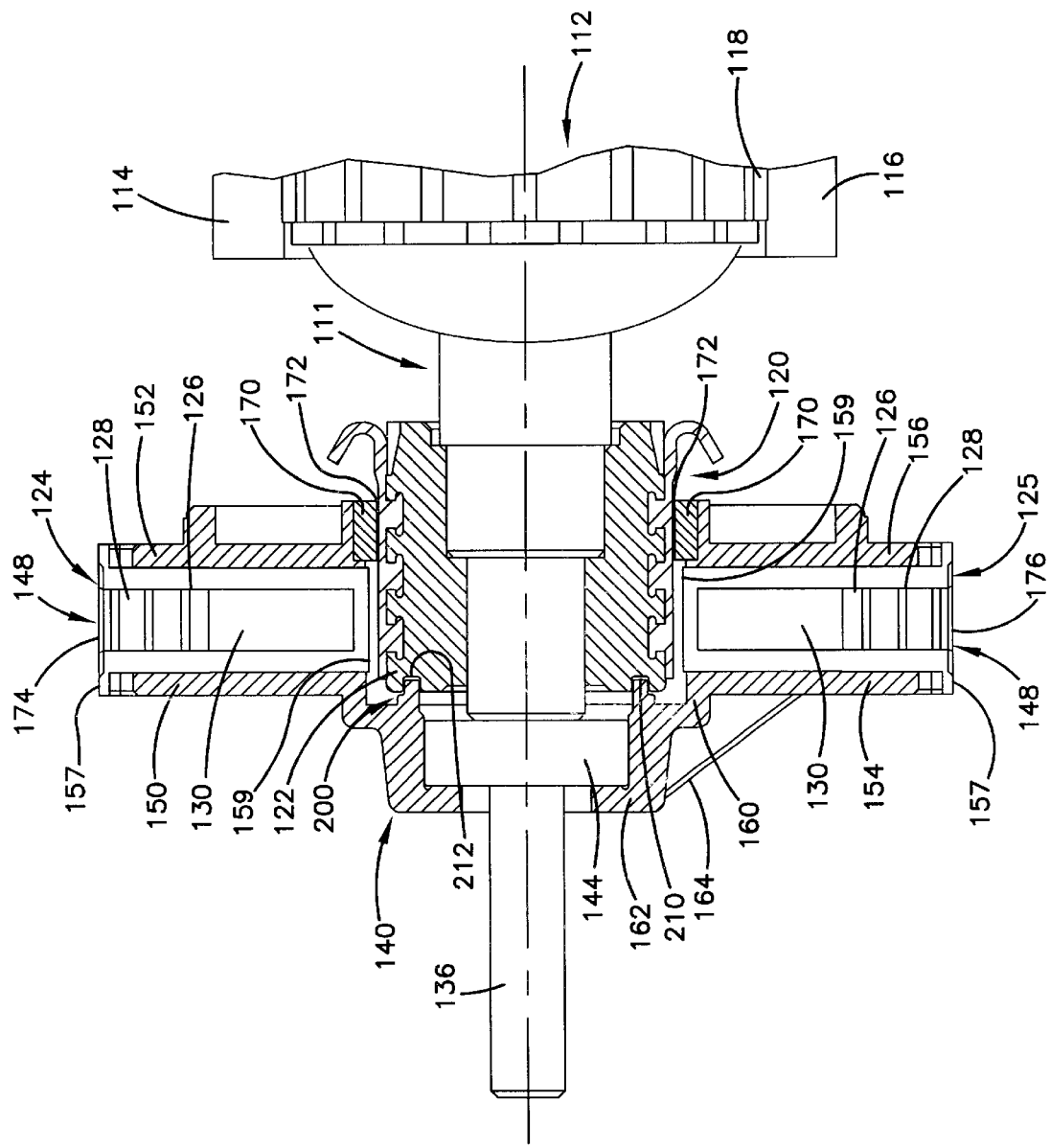
FIG. 9 is a partial cross-sectional view of the electric motor of FIG. 8.

Referring to FIGS. 8 and 9, there is diagramatically shown a third embodiment of the electric motor 100. As shown in FIGS. 8 and 9, the electric motor 100 generally includes a housing 110 having a frontplate 140 and a backplate 134. Additionally, a shaft 136 is rotatably disposed within a front bearing 144. The front bearing 144 is secured in central portions of the frontplate 140.

The housing 110 encloses a motor assembly 111 designated by a rotational assembly 112, a stationary assembly 113 and a commutator assembly 120. The rotational assembly 112 further includes an armature 118. The stationary assembly 113 includes permanent magnets 114, 116. Additionally, the commutator assembly 120 includes a commutator 122 and brush assemblies 124, 125. The brush assemblies 124, 125 include brush assembly walls 150, 152, 154, 156, brush springs 128, brush spring stops 129 and conductive brushes 130. Further, the electric motor 100 includes a backplate 134 and a shaft 136. The electric motor 100 can be sufficiently cooled by either forced air or natural convection.

Specifically shown in FIGS. 8 and 9 is an electric motor 100 that encompasses a first seal or a commutator seal 170 for prohibiting sparks, that are created between the commutator 122 and the conductive brushes 130, from entering the internal ambient of the electric motor and eventually the external ambient atmosphere. Additionally, the electric motor 100 encompasses a second seal or a dust seal 200 that isolates carbon dust produced by the conductive brushes 130 from the grounded metal surfaces of the shaft 136 and the front bearing 144. Both the commutator seal 170 and the dust seal 200 are fully discussed above, and need not be repeated herewith.

The foregoing description of the invention has been presented for purposes of illustration and description, and is not intended to be exhaustive or to limit the invention to the precise form disclosed. The description was selected to explain the principles of the invention in various embodiments and various modifications as are suited to the particular use contemplated. It is intended that the scope of the invention not be limited by the specification, but defined by the claims set forth below:

The claimed invention is:

1. An electric motor comprising:
   a commutator assembly including a commutator and a brush assembly, the brush assembly including conductive brushes in contact with the commutator;
   a shaft rotatably mounted about an axis;
   a bearing disposed around the shaft;
   the commutator connected on the shaft;
   a frontplate integrally connected to a housing enclosing the electric motor; and
   a seal surrounding the commutator, wherein the seal is integrally connected to a back portion of a commutator collar and radially surrounds a portion of the commutator that reciprocally faces the back portion of the commutator collar while not being in contact with the commutator, wherein the frontplate and the seal substantially isolate the commutator assembly from the internal ambient atmosphere of the electric motor.

2. An electric motor according to claim 1, wherein the housing encloses the electric motor and comprises a cylindrical wall unit having the frontplate connected to a front end of the cylindrical wall unit, and a backplate connected to a back end of the cylindrical wall unit.

3. An electric motor according to claim 2, wherein a plurality of ribs are radially arranged on the frontplate and are spaced to form a plurality of air canals for allowing air flow through the housing, and a plurality of ribs are radially arranged on the backplate and are spaced to form a plurality of air canals for allowing air flow out of the housing.

4. An electric motor according to claim 1, wherein an external fan blade is mounted on the shaft and the fan blade direct ventilation air into a plurality of air canals.

5. An electric motor according to claim 1, wherein the brush assembly includes a plurality of bush assemblies radially enclosing the conductive brushes.

6. An electric motor according to claim 1, wherein the brush assembly comprise a top and a bottom portion, a brush end cap located proximate the top portion for enclosing a top portion of the brush assembly.

7. An electric motor according to claim 6, wherein the brush assembly comprise a brush spring stop located proximate the bottom portion of the brush assembly for sealing sparks from vacating from the brush assembly to the internal ambient atmosphere.

8. An electric motor of claim 1, wherein the seal is a male member that engages the back portion of the commutator collar that is a female member.

9. An electric motor comprising:
   a commutator assembly including a commutator and a brush assembly, the brush assembly including conductive brushes in contact with the commutator;

a shaft rotatably mounted about an axis;

a bearing disposed around the shaft;

the commutator connected on the shaft; and a seal surrounding the commutator, wherein the seal forms a contact seal on the commutator, for substantially isolating the commutator assembly from the internal ambient atmosphere of the electric motor.

10. An electric motor comprising:

a commutator assembly including a commutator and a brush assembly, the brush assembly including conductive brushes in contact with the commutator;

a shaft rotatably mounted about an axis;

a bearing disposed around the shaft;

the commutator connected to the shaft; and a seal, wherein the seal comprises an axial protrusion ring and an axial groove ring in an interengaged position forming a close tolerance seal between the conductive brushes and the commutator surface and the shaft and the bearing, and wherein the seal substantially isolates the shaft and the bearing from the commutator and the conductive brushes.

11. An electric motor of claim 10, wherein the axial protrusion ring is a male member and the axial groove ring is a female member, for facilitating a close tolerance seal.

12. An electric motor of claim 10, wherein the axial protrusion ring and the axial groove ring are manufactured from a non-conductive material.

13. An electric motor of claim 10, further comprising a bearing collar, wherein the axial protrusion ring is integrally molded and arranged circumferentially around an end portion of the bearing collar.

14. An electric motor of claim 10, wherein the axial groove ring is inset and arranged circumferentially around an end portion of the commutator.

15. An electric motor of claim 10, wherein the axial protrusion ring is integrally molded and arranged circumferentially around an end portion of the commutator.

16. An electric motor of claim 10, further comprising a bearing collar, wherein the axial groove ring is inset and arranged circumferentially around an end portion of the bearing collar.

17. An electric motor comprising:

a commutator assembly including a commutator and a brush assembly, the brush assembly including conductive brushes in contact with the commutator;

a shaft rotatably mounted about an axis;

a bearing disposed around the shaft;

the commutator connected to the shaft;

a seal, wherein the seal substantially isolates the shaft and the bearing from the commutator and the conductive brushes; and a housing enclosing the electric motor and comprising a cylindrical wall unit having a frontplate integrally connected to a front end of the cylindrical wall unit, and a backplate integrally connected to a back end of the cylindrical wall unit, and wherein the frontplate is integrally connected to the housing and further includes a bearing collar, and wherein the seal forms a contact seal between the bearing collar and the commutator.

18. An electric motor comprising:

a commutator assembly having a commutator and a brush assembly, the brush assembly including conductive brushes in contact with the commutator;

a shaft rotatably mounted about an axis;

a bearing disposed around the shaft;

the commutator connected to the shaft;

a housing enclosing the electric motor and comprising a cylindrical wall unit having a frontplate connected to a front end of the cylindrical wall unit, and a backplate connected to a back end of the cylindrical wall unit;

a first seal surrounding the commutator, wherein the first seal is integrally connected to a back portion of a commutator collar and radially surrounds a portion of the commutator that reciprocally faces the back portion of the commutator collar, wherein the first seal substantially isolates the commutator assembly from the internal ambient atmosphere of the electric motor; and a second seal, wherein the second seal substantially isolates the shaft and the bearing from the commutator and the conductive brushes.

19. An electric motor according to claim 18, wherein a plurality of ribs are radially arranged on the frontplate and are spaced to form a plurality of air canals for allowing air flow through the housing, and a plurality of ribs are radially arranged on the backplate and are spaced to form a plurality of air canals for allowing air flow out of the housing.

20. An electric motor according to claim 18, wherein an external fan blade is mounted on the shaft and the fan blade directs ventilating air into a plurality of air canals.

21. An electric motor according to claim 18, wherein the brush assembly includes a plurality of brush assemblies radially enclosing the conductive brushes.

22. An electric motor according to claim 18, wherein the brush assembly comprises a top and a bottom portion, a brush end cap located proximate the top portion for enclosing a top portion of the brush assembly.

23. An electric motor according to claim 22, wherein the brush assembly comprise a brush spring stop located proximate the bottom portion of the brush assembly for sealing sparks from vacating from the brush assembly to the internal ambient atmosphere.

24. An electric motor of claim 18, wherein the first seal is a male member that engages the back portion of the frontplate that is a female member.

25. An electric motor of claim 18, wherein the first seal is adjacent to the commutator and not in contact with the commutator.

26. An electric motor of claim 18, wherein the first seal is press fit on the commutator, for isolating the commutator assembly from the internal ambient atmosphere of the electric motor.

27. An electric motor of claim 18, wherein the first seal forms a contact seal on the commutator, for isolating the commutator assembly from internal ambient atmosphere of the electric motor.

28. An electric motor of claim 18, wherein an axial groove ring is inset and arranged circumferentially around an end portion of the commutator.

29. An electric motor of claim 18, wherein an axial protrusion ring is integrally molded and arranged circumferentially around an end portion of the commutator.

30. An electric motor of claim 18, wherein the second seal is press fit on a commutator for substantially isolating the shaft and the bearing from the commutator and the conductive brushes.

31. An electric motor of claim 18, wherein the second seal comprises an axial protrusion ring and an axial groove ring in an inter engaged position, wherein a close tolerance seal is formed between, the conductive brushes and the commutator surface, and the shaft and the bearing.

32. An electric motor of claim 31, wherein the axial protrusion ring is a male member and the axial groove ring is a female member, for facilitating a close tolerance seal.

33. An electric motor of claim 31, wherein the axial protrusion ring and the axial groove ring are manufactured from a non-conductive material.

34. An electric motor of claim 18, wherein the frontplate is integrally connected to the housing and further includes a bearing collar.

35. An electric motor of claim 34, wherein an axial protrusion ring is integrally molded and arranged circumferentially around an end portion of the bearing collar.

36. An electric motor of claim 34, wherein an axial groove ring is inset and arranged circumferentially around an end portion of the bearing collar.

37. An electric motor of claim 34, wherein the second seal forms a contact seal between the bearing collar and the commutator.

38. An electric motor of claim 34, wherein the second seal is press fit on the bearing collar for substantially isolating the shaft and the bearing from the commutator and the conductive brushes.

39. A method of isolating a commutator assembly from the internal ambient atmosphere of an electric motor, the method comprising:

provide a commutator assembly including a commutator and a brush assembly, the brush assembly including conductive brushes in contact with the commutator;

providing a shaft rotatably mounted about an axis;

providing a bearing disposed around the shaft;

providing the commutator connected on the shaft; and disposing a seal surrounding the commutator, wherein the seal is integrally connected to a back portion of a commutator collar and radially surrounds a portion of the commutator that reciprocally faces the back portion of the commutator collar while not being in contact with the commutator, and wherein the seal substantially isolates the commutator assembly from the internal ambient atmosphere of the electric motor.

40. A method of isolating a commutator assembly from the internal ambient atmosphere of an electric motor, and a shaft and a bearing from a commutator and conductive brushes, the method comprising:

providing a commutator assembly having a commutator and a brush assembly, the brush assembly including conductive brushes in contact with the commutator;

providing a shaft rotatably mounted about an axis;

providing a bearing disposed around the shaft, and the commutator connected to the shaft;

disposing a first seal surrounding the commutator, wherein the first seal is integrally connected to a back portion of a commutator collar and radially surrounds a portion of the commutator that reciprocally faces the back portion of the commutator collar and wherein the seal substantially isolates the commutator assembly from the internal ambient atmosphere of the electric motor; and disposing a second seal, wherein the second seal substantially isolates the shaft and the bearing from the commutator and the conductive brushes.

\* \* \* \* \*